Patented Mar. 16, 1937

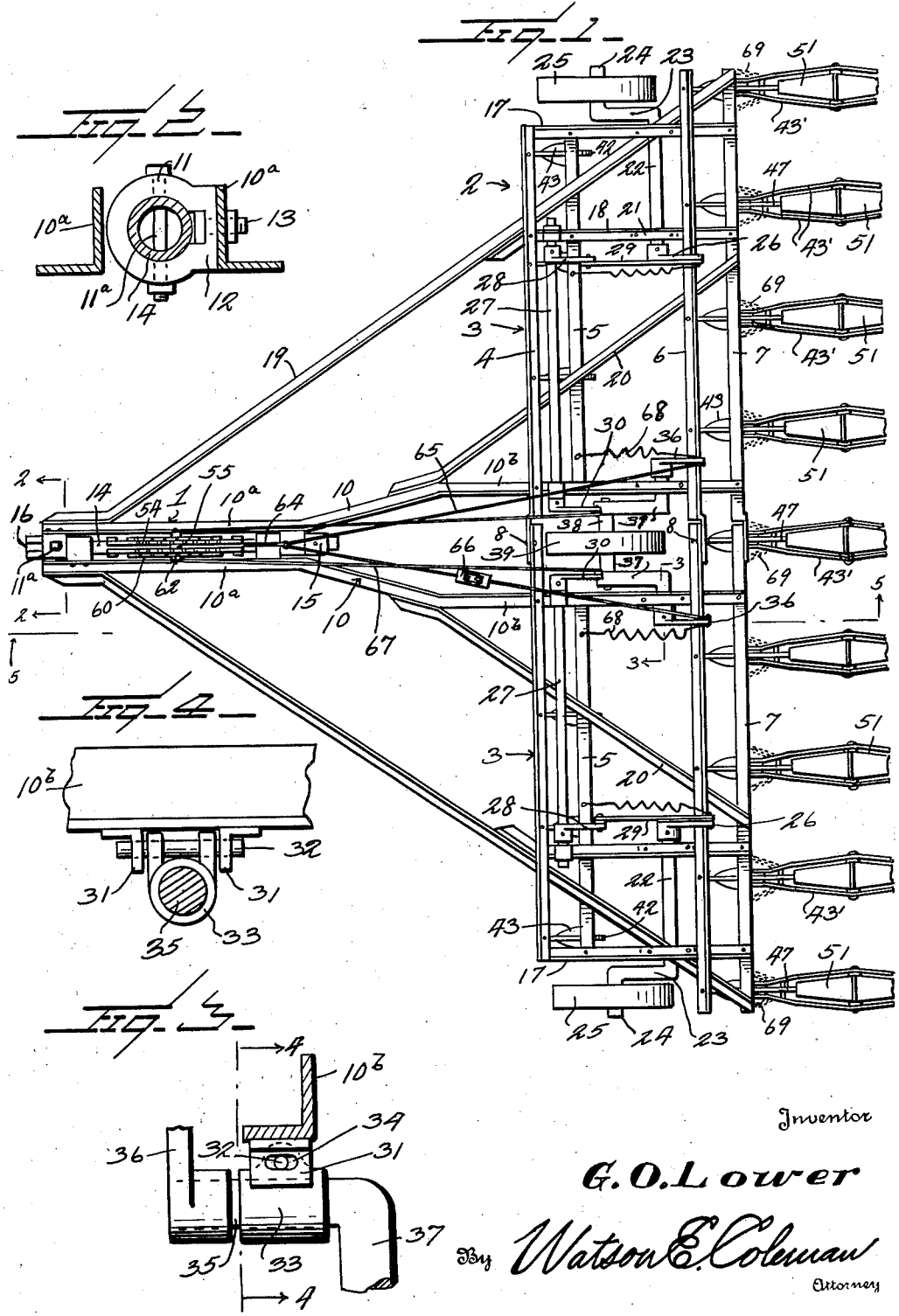

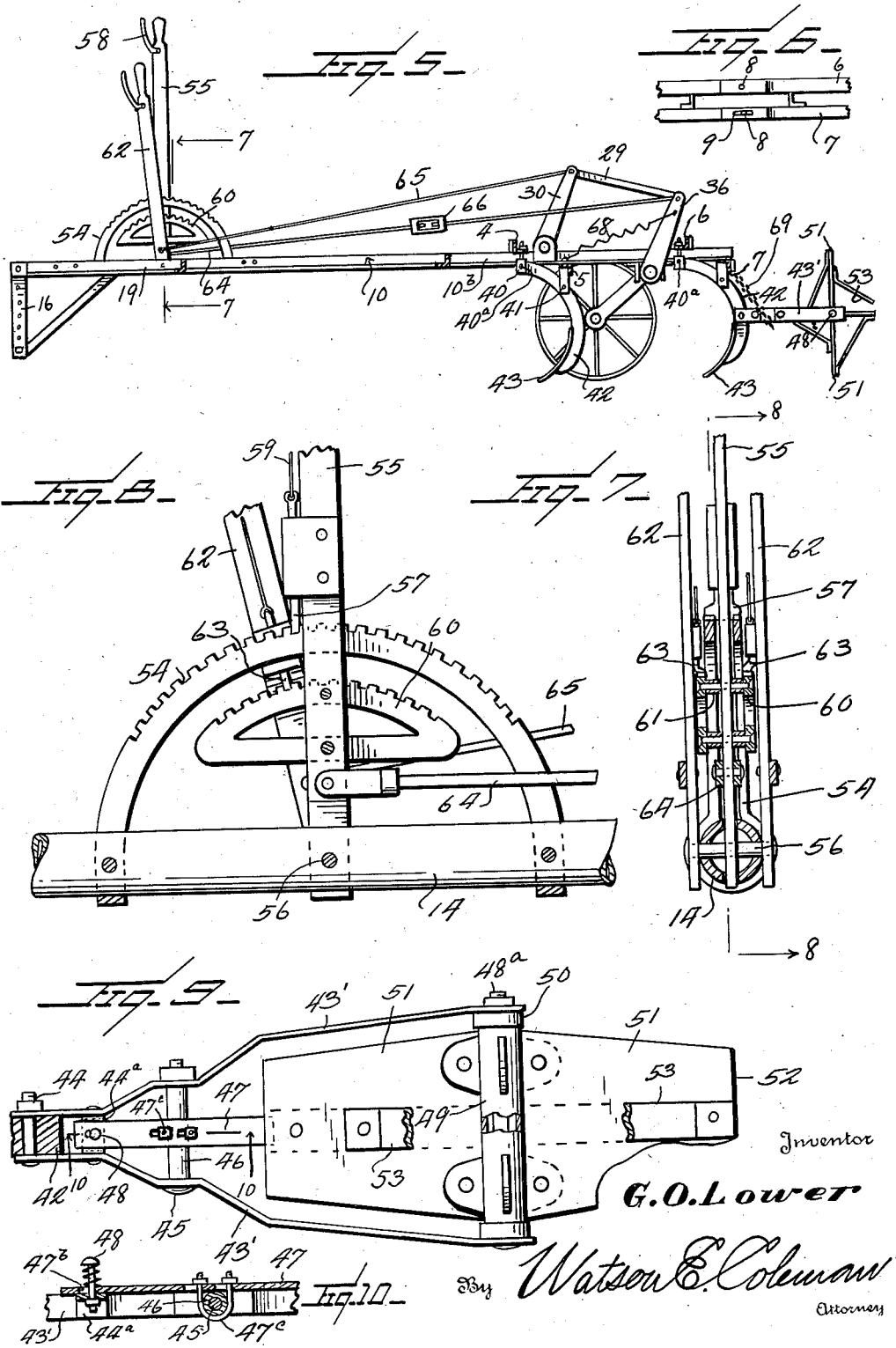

2,073,992

UNITED STATES PATENT OFFICE 2,073,992

AGRICULTURAL IMPLEMENT

Guy O. Lower, Sublette, Kans.

Application April 28, 1936, Serial No. 76,812

12 Claims. (Cl. 97—55)

This invention relates to improvements in agricultural machinery and pertains particularly to a machine for working the ground especially about young crops.

The primary object of the present invention is to provide an improved earth working machine having a novel means whereby adjustments may be made to accommodate the machine to unevenness of the surface over which the machine is travelling.

Another object of the invention is to provide a novel earth working machine having associated with shovels or earth working plows, elements adapted to pile up the earth at spaced intervals in the ground furrows so as to prevent air currents forming along the furrows which would tend to scatter the loosened earth and to also prevent the formation of gulleys in the event of a fall of rain after the ground has been worked.

A further and more specific object of the invention is to provide a farm implement having a body of relatively great width, which is divided into two pivotally joined portions and which has a draft tongue similarly divided, and means associated with the machine and carried by the tongue whereby either of the two sections of the body may be raised or lowered or the two sections may be raised or lowered together.

Still another object of the invention is to provide in a machine having two independently adjustable portions, a novel means whereby the independent adjustment of the portions may be effected and whereby, after adjusting either of the two portions, an adjustment of the entire machine may be made without altering the relation of the previously independently adjusted parts.

A further object of the invention is to provide a novel means of raking or scraping up spaced piles of earth behind the machine shovels by the employment of rotating paddle wheels with means for holding the wheels against rotation until an amount of earth has been scraped up by one thereof, which has sufficient weight to effect the release of the paddle wheel by holding means so that the pile of earth can be left and a new paddle moved into scraping position.

The invention will be best understood from a consideration of the following detailed description taken in connection with the accompanying drawing forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 1 is a view in top plan of the machine embodying the present invention;

Figure 2 is a section taken on the line 2—2 of Figure 1;

Figure 3 is a section taken on the line 3—3 of Figure 1;

Figure 4 is a sectional view taken on the line 4—4 of Figure 3;

Figure 5 is a section taken on the line 5—5 of Figure 1;

Figure 6 is a view showing a detail of the coupling between two portions of the machine frame;

Figure 7 is a section taken on the line 7—7 of Figure 5;

Figure 8 is a section taken on the line 8—8 of Figure 7;

Figure 9 is a view in top plan and upon an enlarged scale of one of the blade or paddle wheels employed for piling the dirt behind the shovels.

Figure 10 is a section on the line 10—10 of Figure 9.

Referring now more particularly to the drawings wherein like numerals of reference designate corresponding parts throughout the several views, the numeral 1 generally designates the tongue of the present machine while the body of the machine is indicated as a whole by the numeral 2. The body 2 is of materially greater width than length, as shown, and is centrally longitudinally divided to form two portions, the line of division between the two portions extending lengthwise of the machine along the center line of the tongue 1.

The two portions of the machine are indicated by the numerals 3 and each portion is made up of the spaced parallel beams 4, 5, 6 and 7, which beams are preferably of angled material of the character commonly known as angle iron.

The beams 4, 6 and 7 of the two portions have their adjacent ends in overlapping relation and are pivotally joined together by the bolts 8. The pivot bolt 8 which couples the overlapping ends of the beams 7 passes through slots 9, which extend longitudinally of the beams 7, as shown in Figure 6, so as to allow for relative movement between the ends of these beams when the two sections of the machines are oscillated upon the pivot bolts. The provision of these slots is necessary in view of the fact that the pivot point between the beams 7 is in a lower plane than the pivot points between the beams 4 and 6 of the two sections.

The tongue 1 comprises the two angle iron beams 10, each of which has an offset portion substantially midway of its ends so that the forward ends of the beams are in closer parallel relation than the rear end portions. The said forward parallel portions of the tongue beams are indicated by the numerals 10ª while the rear portions are indicated by the numerals 10ᵇ, and these rear portions 10ᵇ pass beneath the beams 4 and 6 of the two sections of the machine and over the top of the beams 5 and 7, and are secured to these beams. The beams 5 of the two sections of the machine terminate at the portions 10ᵇ of the tongue, as shown in Figure 1, whereas the other beams of the two portions of the machine extend across the rear ends of the tongue beams and are pivotally connected together by the bolts 8, as previously described. Each of the portions 10ª of the tongue beams has secured to the face opposing the other portion, the two spaced bearing bodies 11, each of which is in the form of a ring having an offset portion 12, which abuts against the adjacent tongue beam portion to which it is secured by a bolt 13. These bearings 11 of the two tongue beams are arranged in axial alinement and have passed therethrough the tubular shaft 14. This shaft is in alinement with the axes of the pivot bolts 8 and upon its rear end it has a collar 15, which abuts the adjacent bearing 11, while at its forward end there is secured thereto a depending hitch bar 16 to facilitate attachment of the machine to a tractor or other draft unit. One of the rings 11, as illustrated, has a bolt 11ª passing therethrough and through the tubular shaft 14 to prevent the shaft turning for the purpose which will hereinafter be made apparent. The outer ends of the beams 4 to 7 inclusive of each of the machine sections 3, are connected by the short parallel side beams 17 and 18, and extending rearwardly in divergent relation from the forward end of the tongue 1 are the outer tongue brace beams 19, which at their rear ends extend across the under sides of the outer ends of the beams 4 and 6 of the two machine sections and across the tops of the outer ends of the two beams 5 and 7 of the machine sections. In parallel relation with these outer brace beams 19 are similar inner brace beams 20 which connect beams 4 to 7 of the two sections in the same manner as the beams 19, and which have their converged forward ends attached to the tongue beams 10 adjacent the forward ends of the portions 10ᵇ thereof.

Each pair of side beams 17 and 18 of a machine section 3 carries a bearing upon its under side at the point 21 and these bearings, which are in alinement transversely of the machine support an outer axle 22 which at its outer end is provided with the angled forwardly and downwardly extending arm 23, which terminates in the outwardly directed portion 24 which passes through the hub of a wheel 25. The inner end of each axle 22 carries a crank arm 26.

Mounted forwardly of each axle 22 and in parallel relation therewith, is a shaft 27 which has upon its outer end a crank arm 28, which is connected by the link 29, with the adjacent axle crank 26. The inner end of each shaft 27 is disposed adjacent the portion 10ᵇ of a tongue beam and carries a inner crank 30.

The portion 10ᵇ of each tongue beam carries upon its under side a pair of spaced depending brackets 31 between which is suspended a pivot pin 32 and this pin supports between the brackets 31 a bearing 33 which is in axial alinement with the bearings in which the axles 22 are supported. These brackets 31 have the apertures 34, in which the ends of the pin 32 are mounted, elongated horizontally, as illustrated in Figure 3, so as to give sufficient play between the structure supported by the bearing 33 and the frame, when the latter is moved for adjusting its parts.

Each bearing 33 supports a short axle 35 which has secured to one end an upwardly and rearwardly extending arm 36. The arms 36 and the arms 26 and 28 all normally extend at the same inclination and in the same direction rearwardly of the machine. This is clearly illustrated in Figure 5. The other end of each of the short axles, which axles are disposed at the central part of the machine and may hereinafter be referred to as central axles, has a downwardly and forwardly extending portion 37, and connecting these portions is a shaft 38 on which is rotatably mounted the wheel 39, which is located upon the longitudinal center of the machine. These portions 37 of the short or central axles 35 together with the portions 23 of the outer axles 22 extend forwardly and downwardly and constitute crank arms which operate to raise the body of the machine on the wheels 25 and 39 when the axles are oscillated in the manner hereinafter described.

Suspended from the under faces of the two forward beams 4 and 5 and of the two rear beams 6 and 7, are pairs of shovel beam carrying units, the front one of each pair being in the form of a clamp and indicated by the numeral 40, while the rear one is in the form of a bracket and is indicated by the numeral 41, and as shown in Figure 5, the clamps are at a higher elevation than the brackets of each pair of units so that the arcuate shovel beams 42, which are attached each to a pair of the units, will be suspended in the proper manner to support a shovel 43 for engagement with the ground. The upper ends of the beams 42 are secured in the clamps 40 by wooden break pins 40ª whereby the application of an excessive strain to the lower end of any shovel beam will result in the breaking of the pin 40ª and thus prevent damage being done to a shovel carried by the beam. Each pair of beams 4 and 5 and each pair of beams 6 and 7, therefore, supports a series of shovels in a line extending transversely of the machine and the series supported by the forward pair of beams is preferably arranged so that each plow will form a path midway between a pair of following plows or shovels.

Attached to each rear shovel beam 42 is a pair of rearwardly extending arms, each of which is indicated by the numeral 43'. The forward ends of these arms contact opposite faces of a shovel beam and are secured thereto by transverse bolts 44, as shown in Figure 9. Connecting the arms 43' adjacent the attached plow beam 42 is a member 44ª through which a vertically extending bolt 48 passes. In advance of the member 44' and extending across between the arms 43' is a bolt 45 having a sleeve 46 thereon and extending across the sleeve is a resilient tongue 47 having the pair of spaced longitudinal slots 47ª and a third slot 47ᵇ in the tongue is located to receive the pin or bolt 48. A U-bolt 47ᶜ surrounds the sleeve 46 and has the ends of its legs extending upwardly through the pair of slots 47ª. These slots permit longitudinal movement of the tongue 47 for wear compensating purposes. Interposed between the head of the bolt 48 and the resilient tongue 47 is a coil spring 48ª.

Connecting the free rear ends of the arms 43' is an axle 48ᵇ on which is mounted a hub 49 which has its ends covered by dust caps 50. Attached to the hub 49 are four blades, each of which is indicated by the numeral 51 and each of which has a broad ground engaging edge 52. Suitable bracing means 53 extend between the blades across the angle so as to give a certain amount of rigidity to the blade. These blades or scrapers 51 are mounted at such an elevation that the lower edge 52 of one will engage the surface of the ground or the bottom of a furrow formed by the preceding plow or shovel and the rear end of the resilient tongue 47 is located to engage beneath one of the horizontally disposed blades so as to prevent the series from turning except when such a quantity of earth has been scraped up by the ground engaging one of the blades as to exert sufficient force against the same to cause the series to force the tongue 47 to bend and allow the series to rotate a quarter of a turn. Mounted upon the tubular shaft 14 is a toothed rack segment 54. This is here illustrated as being in two spaced parallel portions which are joined about the shaft 14, as illustrated in Figure 7, but it is to be understood that a single segment may be employed if desired, although the double segment forms a more rigid support against lateral movement of the lever 55, which is disposed therebetween. This lever 55 is mounted upon the pivot pin 56, which passes through the shaft 14 at the radial center of the toothed segment 54, and the shaft is provided with a suitable slot to receive the lower end of the lever 55, as illustrated in Figure 7. The usual spring controlled pawl 57 is carried by the lever adjacent the toothed edge of the segment 54, for control by the oscillatable handle 58, which is mounted at the upper end of the lever and which is connected with the pawl by the usual wire 59.

Within the area defined by the arcuate toothed rack 54, the lever carries upon each side, a smaller toothed rack segment 60, the toothed face of which is concentric with the toothed face of the segment 54. These segments 60 are supported from the lever 55 by the transverse pins 61 and each of the smaller segments lies in a vertical plane outside of the plane of the segment 54 from the central lever 55.

Oscillatably mounted upon each end of the pin 56 is a smaller lever 62 which carries a spring pressed pawl 63 which has engagement with the teeth of a segment 60.

The main or large lever 55 has pivotally attached thereto beneath the segments 60, a rod 64 which extends rearwardly and has attached to its rear end the forwardly converging ends of the rods 65, each of which is attached at its other or rear end to a crank arm 36 of a central axle 35. One of these rods has a turnbuckle 66 interposed therein whereby necessary adjustments may be made to maintain the two rods of equal length.

Each of the small levers 62 has pivotally attached thereto one end of a rod 67 which extends rearwardly of the machine and is attached at its rear end to a crank arm 39 which is carried upon the inner end of a shaft 27.

In order to make the operation of the levers 55 and 62 easier, the crank arms 26 and 36 have springs 68 connecting them between their outer ends and a beam of the machine frame lying forwardly thereof, as illustrated in Figures 1 and 5.

In the operation of the present machine, the necessary adjustment of the two sections 3 of the body may be made to adapt the machine to the surface contour over which it is to pass by manipulating one or the other of the small levers 62. The actuation of one of these levers will raise or lower one of the sections 3 on the pivot bolts 8 so as to bring the points of the plows or shovels 43 into the desired contact with the ground. After this adjustment has been made, the depth to which the shovels are to penetrate the ground may be regulated by adjusting the large control lever 55. When this lever is oscillated, both portions of the frame structure will be raised or lowered simultaneously, as it will be apparent that upon actuating the lever 55, the rods 65 will be shifted to effect the oscillation of the central axles 35, and since the small rack segments are carried by the lever 55 and are connected by the pawls 63 with the small levers 62, these racks and small levers will also be shifted and this will effect the movement of the rods 67 and the oscillation of the shafts 27 and axles 22.

With the rotating scraper blades 51 trailing the rear shovels 43, the earth in the furrows formed by the shovels will be scraped up and as the blades operate in the manner previously described, piles of earth will be left at intervals with the furrows, which will prevent the formation of air currents along the furrows and will also prevent gulleys being formed by rain water following the furrows.

The brace members 53 are each joined to a blade 51 adjacent the earth engaging edge thereof so that as the blades swing over and are stopped by the resilient tongue 47, the end of a brace 53 will strike the tongue 47 and receive the wear which the blade 51 would be subject to if the brace were not present. As the tongue 47 will wear at its rear end, this wear may be compensated for by loosening the U-bolt 47ᶜ and slipping the tongue rearwardly into a new position. In order that unnecessary strain may not be placed upon the bolts 44 which secure the arms 43' to the rear shovel beams 42 when the body of the machine is raised through the oscillation of the machine crank axles, there are provided suspension chain loops 69 which are attached to the rear beams 7 of the machine body and have the forward ends of the arms 43' extended therethrough as illustrated in Figures 1 and 5.

What is claimed is: —

1. An earth working agricultural implement, comprising a body structure divided longitudinally to form two portions, means pivotally connecting said portions for oscillation on an axis extending longitudinally of the machine, earth working units carried by said portions, a central supporting wheel for the body, an outer supporting wheel at each side of the body, draft means for the body, means whereby the body portions may be raised and lowered relative to the supporting wheels, and means whereby the two portions of the body may be independently shifted in a vertical plane about the pivotal connection between the same and the raising and lowering of the portions simultaneously may be effected.

2. An earth working agricultural implement, comprising a body consisting of two frame portions, means pivotally coupling said portions together whereby the same may have relative movement on a horizontal axis extending longitudinally of the body, a central and two outer supporting wheels, crank-like axles coupling said wheels with the body, said central wheel being disposed on said axis line, a draft tongue coupled with the body portions, a pair of control levers mounted upon said tongue, means coupling each of said levers with a crank axle of an outer wheel for effecting the oscillation of the axle to raise and lower the portion, a third lever mounted upon the tongue, means coupling the said third lever with the central wheel crank axle for effecting the oscillation of the latter, and earth working elements carried by the frame portions.

3. An earth working agricultural implement, comprising a body consisting of two frame portions, means pivotally coupling said portions together whereby the same may have relative movement on a horizontal axis extending longitudinally of the body, a central and two outer supporting wheels, crank-like axles coupling said wheels with the body, said central wheel being disposed on said axis line, a draft tongue coupled with the body portions, a pair of control levers mounted upon said tongue, means coupling each of said levers with a crank axle of an outer wheel for effecting the oscillation of the axle to raise and lower the portion, a third lever mounted upon the tongue, means coupling the said third lever with the central wheel crank axle for effecting the oscillation of the latter, earth working elements carried by the frame portions, and means coupling all of the levers together whereby the actuation of the last mentioned lever will effect simultaneous actuation of the first mentioned two levers.

4. An earth working agricultural implement, comprising a body structure divided to form two portions, pivotal connecting means between said portions facilitating the relative movement of the same upon a horizontal longitudinal extending axis, a pair of crank-like axles oscillatably coupled with the two body portions adjacent the longitudinal center of the body, a wheel carried between the cranks of said axles, a crank-like axle oscillatably mounted at the outer side of each body portion, a wheel carried upon each of the crank portions of the last mentioned axles, an elongated tongue extending forwardly from the body upon the line of said axis, said tongue comprising two parallel portions each carried by a body portion, pivotal conecting means between the tongue portions, a pair of levers supported upon the tongue, coupling means between each lever and an outer crank axle by which the oscillation of the axles may be selectively effected, a third lever carried upon the tongue, and coupling means between said third lever and the first mentioned pair of crank axles whereby the oscillation of the latter may be effected.

5. An earth working agricultural implement, comprising a body structure divided to form two portions, pivotal connecting means between said portions facilitating the relative movement of the same upon a horizontal longitudinal extending axis, a pair of crank-like axles oscillatably coupled with the two body portions adjacent the longitudinal center of the body, a wheel carried between the cranks of said axles, a crank-like axle oscillatably mounted at the outer side of each body portion, a wheel carried upon each of the crank portions of the last mentioned axles, an elongated tongue extending forwardly from the body upon the line of said axis, said tongue comprising two parallel portions each carried by a body portion, pivotal connecting means between the tongue portions, a pair of levers supported upon the tongue, coupling means between each lever and an outer crank axle by which the oscillation of the axles may be selectively effected, a third lever carried upon the tongue, coupling means between said third lever and the first mentioned pair of crank axles whereby the oscillation of the latter may be effected, and releasable coupling means between the first mentioned levers and the third lever whereby the first mentioned levers may be manipulated independently of one another and the third lever and whereby the manipulation of the third lever will effect the simultaneous movement of the two first mentioned levers.

6. An earth working implement, comprising a relatively wide frame structure centrally divided to form two portions, pivotal connecting means between the portions facilitating the relative oscillation of the same upon a horizontal axis, a draft tongue comprising two elongated members disposed in spaced parallel relation upon opposite sides of said axis, pivotal coupling means between the portions of said tongue at the end of the same remote from the frame structure and in alinement with said axis, a body mounted between the members of the tongue at the forward end thereof, a crank axle supported wheel upon the longitudinal center of the frame, a crank axle supported wheel at the outer side of each frame portion, a lever oscillatably mounted upon said member, coupling means between said lever and the first crank axle supported wheel for facilitating the oscillation of the axle, and a pair of levers oscillatably mounted upon the same pivot as the first lever and each coupled with an outer wheel crank axle to facilitate oscillation of the latter.

7. An earth working implement, comprising a relatively wide frame structure centrally divided to form two portions, pivotal connecting means between the portions facilitating the relative oscillation of the same upon a horizontal axis, a draft tongue comprising two elongated members disposed in spaced parallel relation upon opposite sides of said axis, pivotal coupling means between the portions of said tongue at the end of the same remote from the frame structure and in alinement with said axis, a body mounted between the members of the tongue at the forward end thereof, a crank axle supported wheel upon the longitudinal center of the frame, a crank axle supported wheel at the outer side of each frame portion, a lever oscillatably mounted upon said member, coupling means between said lever and the first crank axle supported wheel for facilitating the oscillation of the axle, a pair of levers oscillatably mounted upon the same pivot as the first lever and each coupled with an outer wheel crank axle to facilitate oscillation of the latter, a rack segment associated with each of said levers, shiftable pawl means carried by each lever for engagement with a segment, the segment for the first mentioned lever being rigidly supported upon the lever supporting member, and the segments for the other levers being secured to and movable with the first mentioned lever.

8. An earth working agricultural implement, comprising a relatively wide body structure divided centrally to form two portions, each of said body portions including a forward pair of spaced parallel members and a rear pair of spaced parallel members, the said forward and rear pairs of members being divided in two groups arranged in vertically spaced planes, pivotal coupling means between adjacent ends of certain of the members of the two body portions facilitating relative oscillation of the portions upon a horizontal axis, a tongue member comprising two elongated parallel bars arranged on opposite sides of and parallel with said axis, each of said bearings passing beneath a pair of bar members of one portion of the frame and across the top of another pair of bar members of the same frame, means pivotally connecting the forward ends of the tongue bars upon a horizontal axis in alinement with the pivotal connection between the frame portions, wheel supporting means at the central part of the frame and at the outer ends of the portions thereof designed to facilitate raising and lowering of the frame, a plurality of arcuate bars associated with each pair of bar members of each frame portion, hanger brackets securing said arcuate bars to the adjacent pairs of frame bars, and an earth working shovel carried upon the lower end of each of said arcuate bars.

9. An agricultural implement, comprising a relatively wide body structure divided longitudinally to form two portions, pivotal connecting means facilitating relative vertical movement of said portions upon a central horizontal axis, an elongated tongue extending from the central part of said body and comprising two spaced parallel bar members connected at their rear ends with the portions of the body, bearing members secured to the opposing faces of the tongue members at the forward end of the tongue, an elongated tubular shaft passing through and connecting the bearing members of the tongue bars, means at the forward end of the shaft facilitating the attachment of the tongue to a draft machine, a pair of crank-like axles each oscillatably secured to a portion of the body, a wheel rotatably carried between the crank portions of said axles upon the longitudinal center of the body, a crank-like axle oscillatably secured to each portion of the body at the outer side thereof, a wheel carried upon the crank-like portion of each of said last axles, a lever oscillatably mounted upon said shaft, connecting means between said lever and said first mentioned crank axles facilitating the oscillation of the same, a pair of levers mounted upon said shaft for oscillation upon the same center as the first lever, connecting means between each of said pair of levers and one of the second mentioned pair of crank axles facilitating the oscillation of the latter independently of one another, means for detachably securing the first mentioned lever in adjusted position, means for detachably securing each of the second mentioned levers with the first mentioned lever, and a plurality of earth working units carried by each of the body portions.

10. An agricultural machine of the character described, comprising a pair of frames, pivotal means between the frames facilitating the relative movement of the same vertically, a rigid bar member secured at one end to and extending transversely of each frame adjacent the pivotal connection, said bar members extending forwardly in spaced parallel relation, brace bars extending from each of said first bars obliquely therefrom and across the adjacent frames, a hinge knuckle carried by each of the first mentioned bars and arranged in alined relation with the knuckle upon the adjacent bar, a pivot pin disposed horizontally between the first mentioned bars and passing through the alined knuckles, means at the forward ends of the first mentioned bars for attaching a draft machine thereto, crank axles oscillatably carried by the frames, wheels carried by said axles, means for effecting the oscillation of said axles both independently and simultaneously whereby the raising and lowering of the frames is effected, and earth working elements secured to and depending from said frames.

11. An agricultural implement, comprising two horizontally disposed frames, each of said frames comprising two pairs of spaced parallel beams, the beams of each pair being in vertically spaced relation, the pairs of beams of the two frames being in end to end alinement, pivotal connecting means between the adjacent ends of the alined beams, transverse connecting beams between the pairs of beams of each frame, the connecting beams lying between the vertically spaced beams of the pairs, crank axles carried by the frames at the outer ends and at the pivotally connected ends, wheels carried by said crank axles, a pair of elongated beams each having an end disposed across a frame adjacent the pivotal connection and extending forwardly in spaced relation with the adjacent beam, means forming a horizontal pivot between the forward ends of said forwardly extending beams, said last pivot being alined with the pivotal connection between the frame beams, means for effecting the oscillation of said crank axles to raise and lower the frame, and a plurality of earth working units carried by each frame, each of said units comprising a vertically arranged arcuate beam extending at its upper end across a pair of vertically spaced beams and attached to each, and a shovel upon the lower end of the arcuate frame supported beam.

12. An agricultural implement, comprising a pair of elongated horizontally disposed frames arranged in end to end relation, pivotal coupling means between the adjacent ends of the frames permitting the vertical adjustment of the same on a horizontal axis extending transversely thereof, an elongated tongue member comprising a pair of beams arranged in spaced parallel relation and each secured across a frame adjacent said pivotal connection, the forward ends of said parallel beams being inset into closer parallel relation than the rear ends thereof, crank axles carried by the frames, wheels carried by the crank axles, said wheels being disposed one at the outer end of each frame and one upon the pivotal center between the frames, an elongated pivot bar disposed between the inset parallel portions of the tongue beams and pivotally connecting the beams together, a control lever oscillatably mounted upon said pivot pin and coupled with said center wheel supporting axle for actuation of the same, a pair of control levers oscillatably mounted upon the same center as the first lever and operatively coupled each with the axle of a wheel at the outer side of a frame, means whereby the oscillation of the first lever will effect the simultaneous operation of the pair of levers, and earth working elements carried by the frame.

GUY O. LOWER.